US006212058B1

United States Patent
Huber (12)

(10) Patent No.: US 6,212,058 B1
(45) Date of Patent: Apr. 3, 2001

(54) POWER CAPACITOR

(75) Inventor: Robert Huber, Landshut (DE)

(73) Assignee: Vishay Electronic GmbH, Landshut (DE)

( * ) Notice: Subject to any disclaimer, the term of this patent is extended or adjusted under 35 U.S.C. 154(b) by 0 days.

(21) Appl. No.: 09/281,627

(22) Filed: Mar. 30, 1999

(30) Foreign Application Priority Data

Apr. 1, 1998 (DE) ............................... 198 14 700

(51) Int. Cl.$^7$ ................................. H01G 4/00; H01G 4/32
(52) U.S. Cl. ........................... 361/301.5; 361/301.3; 361/329
(58) Field of Search .............................. 361/301.3, 301.5, 361/328, 329, 830; 174/52.2, 52.3, 52.4

(56) References Cited

U.S. PATENT DOCUMENTS 3,619,877  11/1971  Hansen .

FOREIGN PATENT DOCUMENTS

| 518497 | 2/1931 | (DE) . |
| 1029482 | 5/1958 | (DE) . |
| 1764335 | 10/1971 | (DE) . |
| 2931536 | 2/1981 | (DE) . |
| 4302420C1 | 3/1994 | (DE) . |
| 4125197C2 | 12/1997 | (DE) . |
| 2173041A | 10/1986 | (GB) . |

*Primary Examiner*—Anthony Dinkins
(74) *Attorney, Agent, or Firm*—Townsend and Townsend and Crew LLP

(57) ABSTRACT

In a power capacitor with a plurality of round, wound elements accommodated in a common housing at least one wound element group consisting of three round, wound elements is accommodated in the housing, with the wound elements of the group being arranged in star-form alongside one another, with their axes parallel to one another. The housing has in cross-section in general the shape of a triangle having rounded corners, with a radius of curvature which corresponds at least substantially to the radius of the round, wound elements.

18 Claims, 2 Drawing Sheets

POWER CAPACITOR

BACKGROUND OF THE INVENTION

1. Field of the Invention

The invention relates to a power capacitor comprising a plurality of round, wound elements accommodated in a common housing.

2. Description of the Prior Art

The previously customary power capacitors of this kind have, as a rule, a housing of round, circular cross-section or rectangular cross-section. Power capacitors with circular, round housings have, among other things, the disadvantage that any arrangement in which a plurality of such capacitors are arranged alongside one another requires a relatively large amount of space. Moreover, the outer cooling surface of such capacitors is relatively small. Capacitors with housings with a rectangular or square cross-section can admittedly be better placed together in a row. However, it is a disadvantage of such capacitors that when using round coils, the housing volume is only poorly exploited. In the known capacitors it is frequently also necessary for electrical connections of different potential to cross one another, which is, as a rule, associated with a relatively high insulating cost and complexity for the associated wiring. Moreover, the construction of electrical delta circuits always leads, both with round coils arranged above one another alongside one another and also with concentric round coils, to dissimilar, asymmetric line lengths with crossing lines of high potential difference, which, among other things, gives rise to the disadvantage of non-symmetrical series resistances and inductivities, and also to the danger of insulation faults. In connection with star circuits With round windings accommodated above one another in cylindrical housings, a relatively high level of cost and complexity for insulation for the lines is generally necessary and much space is required in order to form the star point and to lead the phase lines upwardly to the common connection.

Moreover, with fully potted, round, wound embodiments in the cylindrical housing, the possibility of leading off the gas which arises into the connection space, without a dangerous excess pressure arising, hardly exists in the case of a fault, i.e. in particular, with a non-self healing breakdown with gas formation. Cylindrical, potted capacitors thus require special passages or permeable winding sleeves in order to facilitate the leading off of gas. These additionally required measures are, however, always associated with an increased space requirement, a higher thermal resistance and higher additional costs.

BRIEF SUMMARY OF THE INVENTION

The object of the invention is to provide a power capacitor of the initially named kind, in which the previously named disadvantages are overcome, which is as compact as possible, which is of simple construction and which can be manufactured with low technical manufacturing cost and complexity. Through a reduced constructional height and simplified internal wiring, both the best possible ideal exploitation of the housing volume and also a good ability to place the power capacitors in a row should be ensured.

This object is satisfied in accordance with the invention wherein at least one wound element group comprising three round, wound elements is accommodated in the housing, with the wound elements of the group being arranged in a star-like arrangement alongside one another with their axes parallel to one another, and in that the housing generally has the shape of a triangle with rounded corners having a radius of curvature, which corresponds at least substantially to the radius of the round, wound elements.

As a result of this design, a compact power capacitor results, which can be arranged in a row and which is of reduced constructional height, in which two previously contradictory requirements are satisfied while achieving improved arrangeability in a row and an increased exploitation of the volume. In comparison to the previously customary capacitors with round, circular housings, not only is the ability to place the capacitor in a row improved, but rather one also obtains a larger, external cooling surface. As a consequence of the ideal exploitation of the housing volume, a lower requirement for filler materials results. Moreover, an optionally desired overpressure switch-off security device in the form of a rupturable fuse can be realized more simply with side walls which bend outwardly more easily. Moreover, the assembly of three-phase capacitors in a delta or star circuit or in an open circuit is in particular simplified, since all the connection elements have the same length and shape, and can thus have symmetrical line resistances and inductivities, whereby the manufacturing costs are lowered in total. The wiring lines can be laid without problem into the creases formed between the round, wound elements, in particular with a delta circuit and an open circuit. With a star circuit, symmetrical and extremely short connections are also possible for the phases and the end face. The leads can be attached in a simple manner to the end faces of the windings, without connections of different potential crossing one another. The cost and complexity of the insulation of the wiring is correspondingly lower.

In an embodiment of the power capacitor of the invention preferred in practice, the three wound elements have the same diameter, so that the housing can in general adopt a cross-section in the shape of an equilateral triangle.

One or more wound element groups, each comprising three round wound elements can be accommodated in the housing. If a plurality of such wound element groups are provided, then these should be expediently arranged above one another.

The preferably impregnated housing can basically consist of a metal material or plastic material. In accordance with a preferred, practical embodiment, it consists of a flow-pressed aluminum. Such manufacture from an aluminum in the flow-press process offers, in conjunction with a sealed, welded housing or a housing with a turned-over edge, an ideal corrosion protection, especially for outside use.

It is of particular advantage if the power capacitor is provided with an overpressure switch-off safety device, which can, for example, be a rupturable fuse. In this arrangement, electrical connections provided at the cover side can be lead through the closed housing, which is partly provided with a filling, preferably a potting material, with the electrical connections extending within the housing through a pressure space left between the filling and the housing cover, and being interruptable on the occurrence of a predeterminable overpressure in the housing. If the housing is partly filled with an insulating, potting material permeable to pressure gas, and if the pressure space is provided between this potting material and the housing cover, then a reliable and rapidly responding overpressure switch-off device can already be realized if the housing has at least substantially flat side walls, which, on the liberation of pressure gas, can be bent outwardly and also provide connections to the pressure space. It is important in this respect that flat side walls can be more easily bent outwardly on pressure loading than is the case with curved side walls, so that connections which are open to the pressure space can be provided in the desired manner. In this respect it is simultaneously of advantage that in normal operation the potting material is connected to the housing over the entire peripheral surface, whereby an ideal thermal dissipation is ensured.

The electrical connections can, in particular, be fixed to the housing cover, so that they can be torn off from the outwardly arching housing cover on pressure loading of the pressure space, which takes place with outward bending of the side walls.

In an embodiment of the power capacitor of the invention, which is preferred in practice, the electrical connections are fixed at one end to the housing cover and at the other end to at least one support element, housing step and/or the like arranged in the pressure space and having a predeterminable spacing from the housing cover. In this connection the electrical connections can be fixed within the housing to at least one support element, the spacing of which from the housing cover is determined by at least one spacer or hold-down element. The tearing force acts in this case against the spacer or hold-down element and the support element, i.e. against at least one housing step.

In a preferred, practical embodiment a reinforced housing base is provided and preferably has a fastener element. In this connection, the housing base can be at least partly reinforced by potting material, which is provided between the housing base and the wound elements, which have a predeterminable spacing from the housing base. The housing cover can in particular be made thinner than the housing base. Through the reinforcement of the housing base an overload in the base region of the housing, which occurs in the case of a pressure rise, is avoided.

If the housing consists of a metal material, then at least one electrically non-conductive insulating insert can be provided between the side walls of the housing, on the one hand, and the filling and the wound elements, on the other hand.

At least one such electrically non-conductive insulating insert can also be provided between adjacently disposed wound elements. If a plurality of wound elements or wound element groups lie above one another, then at least one electrically non-conductive insulating insert can be provided between these wound elements or wound element groups.

DETAILED DESCRIPTION OF THE PREFERRED EXEMPLARY EMBODIMENTS

Figure 1:
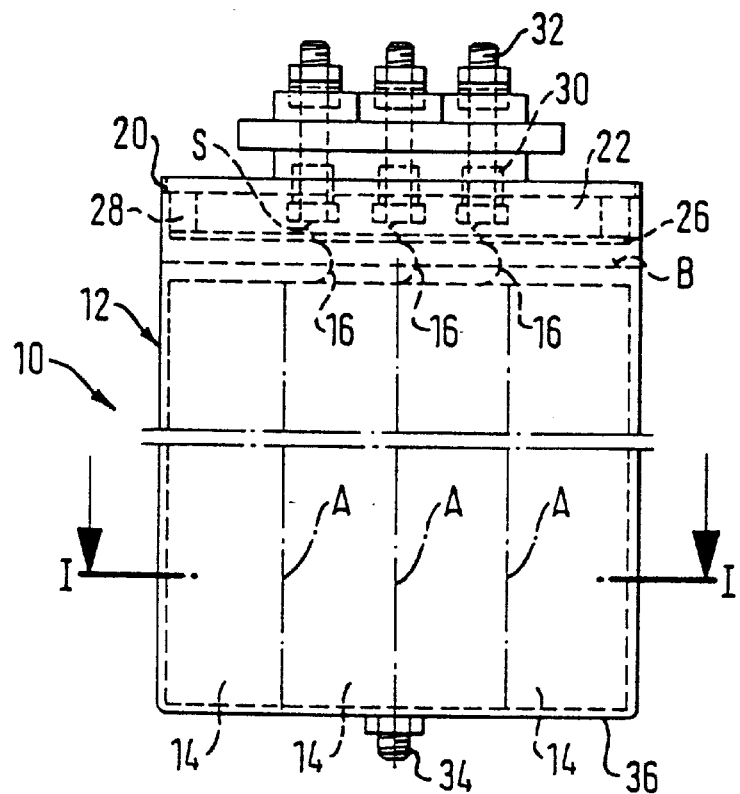
FIG. 1 is a schematic cut-away side view of a power capacitor having a plurality of round, wound elements accommodated in a common housing.
Figure 2:
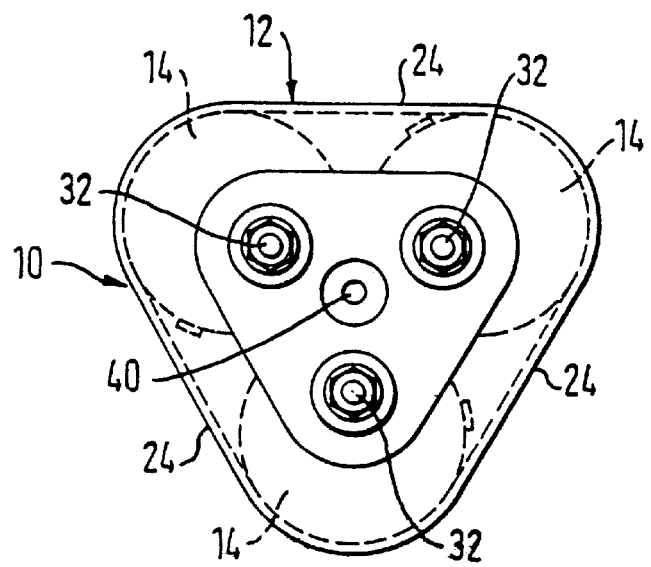
FIG. 2 is a cross-sectional view of the power capacitor sectioned along the line I—I of FIG. 1.
Figure 3:
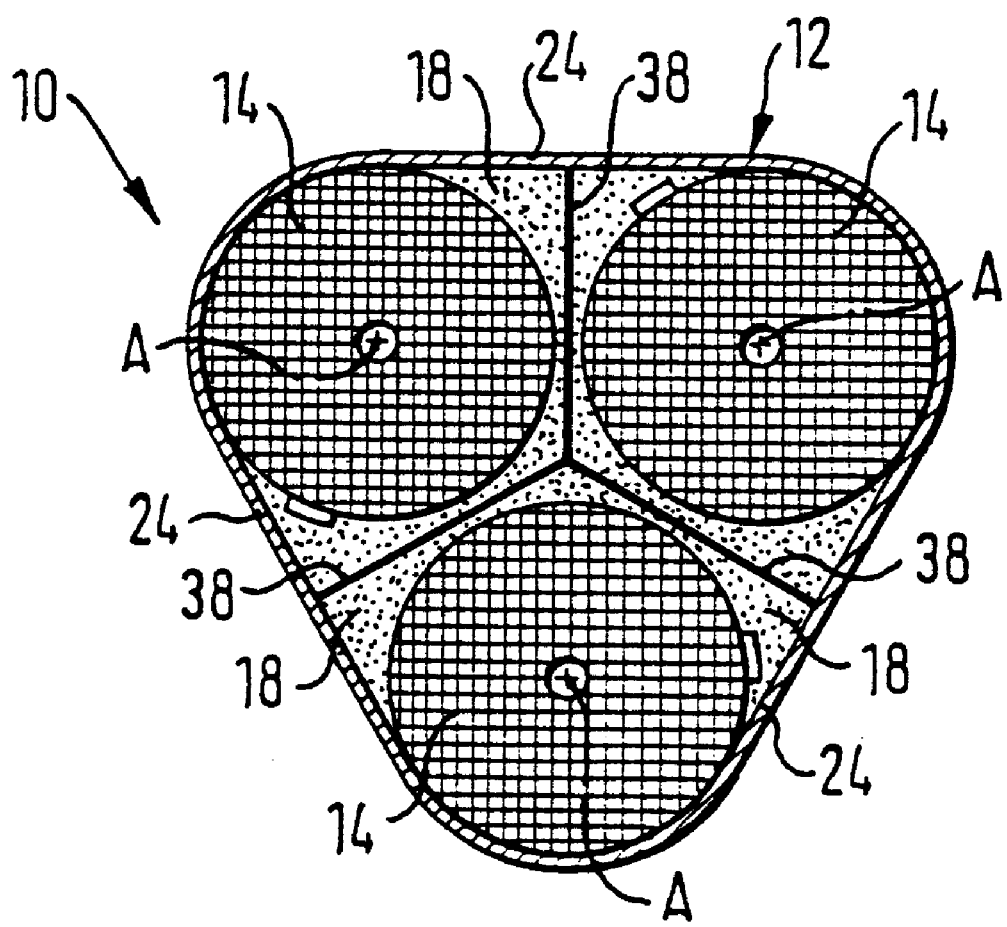
FIG. 3 is a plan view of the power capacitor shown in FIG. 1.

In FIGS. 1 to 3, an electrical power capacitor 10 having three round, wound elements 14 accommodated in a common housing 12 is shown in a purely schematic representation.

In this arrangement the three round, wound elements 14 are arranged in star-like manner alongside one another, with their axes parallel to one another. The housing 12 has in cross-section generally the shape of a triangle, the corners of which are rounded and have a radius of curvature corresponding at least substantially to the radius of the round, wound elements 14.

In the present case, the three wound elements 14 have the same diameter, so that the housing 12 generally has the shape of an equilateral triangle in cross-section.

The housing, which preferably consists of flow-pressed aluminum, is formed as a closed housing 12. It can be filled at least partly with potting material, oil and/or gas. In FIG. 1 the level for the potting material or for the oil filling is designated by B.

In the present case a filling of potting material is provided. In this connection, the power capacitor 10 is additionally provided with an overpressure switch-off security device S in the form of a rupturable fuse, which will be described in more detail in the following.

As can in particular be recognized with reference to FIG. 1, electrical connections 16 are led at the cover side through the closed housing 12, which is partly filled with potting material 18 (see FIG. 3). The connections extend within the housing 12 through a pressure space 22 left between the potting material 18 and the housing cover 20 consisting of insulating material and can be interrupted, i.e. in the present case torn off, on the occurrence of a predeterminable overpressure in the housing 12.

An insulating material penetratable by pressure gas is provided as the potting material 18 and extends from the base of the housing 12 up to the level B (see FIG. 1), with the pressure space 22 being formed between the potting material 18 and the housing cover 20. As a result of the triangular cross-sectional shape of the housing 12, this housing 12 has three substantially flat side walls 24 (see in particular FIGS. 2 and 3), which can be bent outwardly on liberation of pressure gas and also provide connections to the pressure space 22.

The electrical connections 16 are fixed to the housing cover 20. With pressure gas loading of the pressure space 22 taking place through an outward bending of the side walls 24, the electrical connections 16 are torn off from the outwardly arching housing cover 20.

In the present case, the electrical connections 16 are fixed on the one end to the housing cover 20 and at the other end to a support element 26 arranged in the pressure space 22 and having a predeterminable spacing from the housing cover 20. In this arrangement, the spacing between the support elements 26 and the housing cover 20 is determined by at least one spacer or hold-down element 28. The tearing force thus acts against the support element 26 and the at least one spacer or holding element 28.

The electrical terminals 16 can be fixed to the housing cover 20 in the region of sealing lead-throughs 30. As can be recognized with respect to FIGS. 1 and 2, the electrical connections 16 are led up to outer electrical connection terminals 32.

The housing base 36 provided with a fastener element 34 (see FIG. 1) is reinforced by the potting material 18, which is provided between the housing base 36 and the wound elements 14, which have a predeterminable spacing from the housing base. In this way, the stability of the housing 12 is improved in the base region.

The housing cover 20 is preferably made thinner than the housing base 36 which is reinforced in this manner, so that an excess pressure in the housing, which arises in the case of a break-down, brings about an outwardly directed arching of the housing cover 20, which ultimately leads to tearing off of the electrical connections 16.

An electrically non-conductive insulating insert 38 is provided between the side walls 24 of the housing at the one side and the potting material 18 or the wound elements 14 at the other side (see in particular FIG. 3). An electrically non-conductive insulating insert of this kind is also arranged between respective pairs of adjacently disposed wound elements 14.

In the cover region of the housing 12 a central filling opening 40 is provided for a filling which is to be introduced into the housing 12.

The wound elements 14 of the power capacitor 10 can be electrically connected in accordance with a delta circuit, a star circuit, in parallel or also in accordance with a single phase. Both lead-throughs as three-component groups for three-phase capacitors and also lead-throughs in the form of individual lead-throughs are conceivable. The layout of a three-phase capacitor in a delta circuit, a star circuit or in an open circuit is of particular advantage.

What is claimed is:

1. A power capacitor having a plurality of round, wound elements accommodated in a common housing, wherein at least one wound element group comprising three round wound elements is accommodated in the housing, with the wound elements of the group being arranged in a star-like arrangement alongside one another with their axes parallel to one another, and wherein the housing substantially has a shape of a triangle with rounded corners having a radius of curvature, which corresponds at least substantially to the radius of the round, wound elements.

2. A power capacitor in accordance with claim 1, wherein the three wound elements have a same diameter and wherein the housing substantially has the shape of an equilateral triangle in cross-section.

3. A power capacitor in accordance with claim 1, wherein a plurality of wound element groups, each consisting of three round, wound elements are accommodated above one another in the housing.

4. A power capacitor in accordance with claim 1, wherein the housing is impregnated and consists of a metal material or of plastic material.

5. A power capacitor in accordance with claim 1, wherein the housing consists of flow pressed aluminum.

6. A power capacitor in accordance with claim 1, wherein the housing is formed as a closed housing and is at least partly provided with a filling of at least one of potting material, oil and gas.

7. A power capacitor in accordance with claim 1, wherein it is provided with an overpressure switch off safety device.

8. A power capacitor in accordance with claim 7, wherein electrical connections at the cover side are led through the closed housing, which is partly provided with a filling and extend within the housing through a pressure space left between the filling and the housing cover, and are interruptible on the occurrence of a predeterminable overpressure in the housing.

9. A power capacitor in accordance with claim 8, wherein the housing is partly filled with an insulating potting material permeable by pressure gas and the pressure space is provided between this potting material and the housing cover; and wherein the housing has three, at least substantially flat side walls, which can bend outwardly when pressure gas is liberated and also provide connections to the pressure space.

10. A power capacitor in accordance with claim 7, wherein the electrical connections are fixed to the housing cover and are torn away from the outwardly arching housing cover on pressure loading of the pressure space, which takes place with an outward bending of the side walls.

11. A power capacitor in accordance with claim 10, wherein the electrical connections are fixed at the one end to the housing cover and at the other end to at least one support element or housing step arranged in the pressure space and having a predeterminable spacing from the housing cover.

12. A power capacitor in accordance with claim 11, wherein the electrical connections are fixed within the housing to at least one support element, the spacing of which from the housing cover is determined by at least one spacer or holding down element.

13. A power capacitor in accordance with claim 1, wherein a reinforced housing base is provided, which is preferably provided with a fastening element.

14. A power capacitor in accordance with claim 13, wherein the housing base is reinforced at least partly by potting material, which is provided between the base of the housing and the wound elements, which have a predeterminable spacing from the base of the housing.

15. A power capacitor in accordance with claim 1, wherein the housing cover is made thinner than the housing base.

16. A power capacitor in accordance with claim 1, wherein at least one electrically, non-conductive insulating insert is provided in the area of the wound elements between the side walls of the housing, and the filling or the wound elements.

17. A power capacitor in accordance with claim 1, wherein at least one electrically, non-conductive insulating layer is provided between adjacently disposed, wound elements.

18. A power capacitor in accordance with claim 1, wherein at least two wound elements are provided arranged above one another and at least one, electrically non-conductive insulating insert is provided between the wound elements arranged above one another.

* * * * *